United States Patent
Costa et al.

(10) Patent No.: US 7,514,001 B2
(45) Date of Patent: Apr. 7, 2009

(54) HIGH RECOVERY REVERSE OSMOSIS PROCESS AND APPARATUS

(75) Inventors: Lawrence C. Costa, Mansfield, MA (US); Patrick J. McCabe, Grafton, MA (US)

(73) Assignee: GE Infrastructure, Water & Process Technologies, Watertown, MA (US)

( * ) Notice: Subject to any disclaimer, the term of this patent is extended or adjusted under 35 U.S.C. 154(b) by 80 days.

(21) Appl. No.: 11/342,180

(22) Filed: Jan. 27, 2006

(65) Prior Publication Data

US 2007/0034571 A1     Feb. 15, 2007

Related U.S. Application Data

(63) Continuation of application No. 10/380,846, filed on Apr. 14, 2003, now abandoned.

(51) Int. Cl.
*B01D 61/00* (2006.01)
*B01D 63/00* (2006.01)

(52) U.S. Cl. ................. 210/652; 210/651; 210/639; 210/195.2; 210/85

(58) Field of Classification Search ............ 210/652, 210/651, 639, 641, 195.2, 257.2, 636, 85, 210/87, 89, 93, 134
See application file for complete search history.

(56) References Cited

U.S. PATENT DOCUMENTS

| | | | | |
|---|---|---|---|---|
| 4,176,057 A | * | 11/1979 | Wheatley et al. | 210/637 |
| 4,574,049 A | * | 3/1986 | Pittner | 210/639 |
| 5,244,579 A | * | 9/1993 | Horner et al. | 210/652 |
| 5,766,479 A | * | 6/1998 | Collentro et al. | 210/639 |
| 5,888,401 A | * | 3/1999 | Nguyen | 210/650 |
| 5,925,255 A | * | 7/1999 | Mukhopadhyay | 210/652 |
| 6,054,050 A | * | 4/2000 | Dyke | 210/639 |
| 6,071,413 A | * | 6/2000 | Dyke | 210/651 |
| 6,303,037 B1 | * | 10/2001 | Tamura et al. | 210/652 |
| 6,338,803 B1 | * | 1/2002 | Campbell et al. | 210/652 |
| 6,805,796 B2 | * | 10/2004 | Hirose et al. | 210/321.76 |

FOREIGN PATENT DOCUMENTS

JP          7-163979       *     7/1995

* cited by examiner

*Primary Examiner*—Ana M Fortuna
(74) *Attorney, Agent, or Firm*—David Silverstein; Andover-IP-Law

(57) ABSTRACT

Processes and apparatus are disclosed for producing clear reverse osmosis retentates having silica concentrations which are substantially supersaturated in silica from feedwaters having silica concentrations, without substantial formation of alkali-soluble scale having substantial silica content in the associated reverse osmosis apparatus, by adjusting the pH of such feedwaters to an acidic pH range prior to reverse osmosis in accordance with this invention. Also disclosed are related processes and apparatus for periodically removing minor amounts of alkali-soluble scale having substantial silica content from the apparatus.

12 Claims, 2 Drawing Sheets

HIGH RECOVERY REVERSE OSMOSIS PROCESS AND APPARATUS

This application is a continuation of application Ser. No. 10/380,846 filed on Apr. 14, 2003 now abandoned which designated the U.S.

FIELD OF THE INVENTION

This invention is in the field of water purification. More particularly, this invention describes a method and related apparatus to desalinate water by a high recovery reverse osmosis (high recovery RO) process. This novel high recovery reverse osmosis process comprises a sequence of unit operations which permits economical operation and high recovery of feedwater as purified product (up to 90% or greater) even when the feedwater contains a substantial amount of silica.

BACKGROUND OF THE INVENTION

There is increasing demand for purified water for various industries such as semiconductors, pharmaceuticals, and power generation. More frequently, these industries are located near centers of increasing population. These factors combine to put increased demands on available water supplies, and sophisticated water purification systems are needed to process feedwaters of declining quality (increasing salinity). Additionally, economic factors are demanding that water purification systems become less expensive to build and operate, and environmental factors are demanding that these systems utilize available feedwaters with greater efficiency and generate less waste. These demands can be met by providing improved water purification technologies and systems which economically process and recover a substantial fraction of feedwater as a purified product water, even in areas where the quality of the feedwater is declining.

The present invention provides for economical purification of feedwaters which contain significant concentrations (typically 30 ppm or greater) of silica by means of reverse osmosis (RO), and allows recovery of up to 90% or more of feedwaters as purified product without deposition of insoluble, amorphous silica within the reverse osmosis equipment.

Silica is ubiquitous in natural waters. The solubility limit of such silica in most waters is approximately 125 ppm. However, the chemistry of silica is complex; the actual solubility limit of silica in a particular water is variable and dependent upon numerous factors including temperature, pH, ionic composition, ionic strength, etc. When silica-containing waters are concentrated by means of conventional reverse osmosis and the relevant silica solubility limit is exceeded in the RO retentate, silica can precipitate and form "scale" on exposed surfaces of the system. RO system performance is then greatly degraded, and it is expensive and difficult to remove such scale once it has formed. For many natural waters with native silica concentrations of 30-80 ppm, the maximum practical recovery of purified water by conventional RO is limited to about 35-70%.

Former methods for achieving high recovery of silica-containing feedwaters as purified product by means of RO have relied on extensive and expensive pretreatment processing of feedwaters prior to RO, or alternatively on the addition of expensive "anti-scalant" chemicals. Such former preferred methods typically require adjusting the pH of the feedwaters to 10 or greater in order substantially to ionize silica and thereby maintain silica in solution. Levels of hardness in such feedwaters must first be reduced to very low concentrations, however, to prevent a different problem, namely deposition of mineral scale when the pH of the feedwaters is increased to relatively high pH levels. It is desirable also in such former methods to reduce the level of dissolved carbon dioxide in the feedwaters to reduce chemical usage needed for increasing the pH. Reference may be made to the work of Mavrov et al. (Desalination, 123 (1999) 33-43), and to U.S. Pat. No. 5,925,255 (Mukhopadhyay), which are incorporated herein by reference, for further discussions of such former methods.

The success of addition of "silica anti-scalant" chemicals to RO feedwaters is generally limited to applications producing RO retentates with not more than about 200-300 ppm silica. Thus high recovery (e.g., 90% or greater) of feedwaters containing significant concentrations of dissolved silica is generally not possible with silica anti-scalants. Reference may be made to Darton (Desalination, 124 (1999) 33-41), which is incorporated herein by reference.

SUMMARY OF THE INVENTION

A novel process and related apparatus for removal of silica from aqueous solutions is provided herein. In one aspect of the present invention, the pH of a silica-containing solution is adjusted to an acidic pH. The acidified solution is then processed through a reverse osmosis apparatus. In one embodiment, the acidified solution has pH between 1 and 6; preferably, the pH is between 2 and 5. The pH is adjusted with either mineral or organic acids. Preferably the acid is hydrochloric acid, sulfuric acid, gallic acid, ascorbic acid or combinations thereof.

In another aspect of this invention, silica-containing aqueous solution is subjected to a pretreatment process prior to the acidification step. The pretreatment process can include conventional reverse osmosis, softening, ion-exchange, flocculation, precipitation, absorption, nanofiltration, electrodialysis, electrodialysis reversal, microfiltration (membrane filtration), electrodiaresis, electrodeionization, filled cell electrodialysis, irradiation and combinations thereof. In yet another aspect of this invention, there is provided a process and apparatus for removal of silica from aqueous solutions. The process includes the steps of: (a) passing silica-containing solution through a pretreatment process to produce a first-treated solution; (b) adjusting the pH of the first-treated solution to an acidic pH to produce an acid-treated solution; and (c) passing the acid-treated solution through a reverse osmosis apparatus according to the present invention.

BRIEF DESCRIPTION OF THE DRAWINGS

The various features of invention may be more fully understood from the following description when read together with the accompanying drawings.

DETAILED DESCRIPTION

Figure 1:
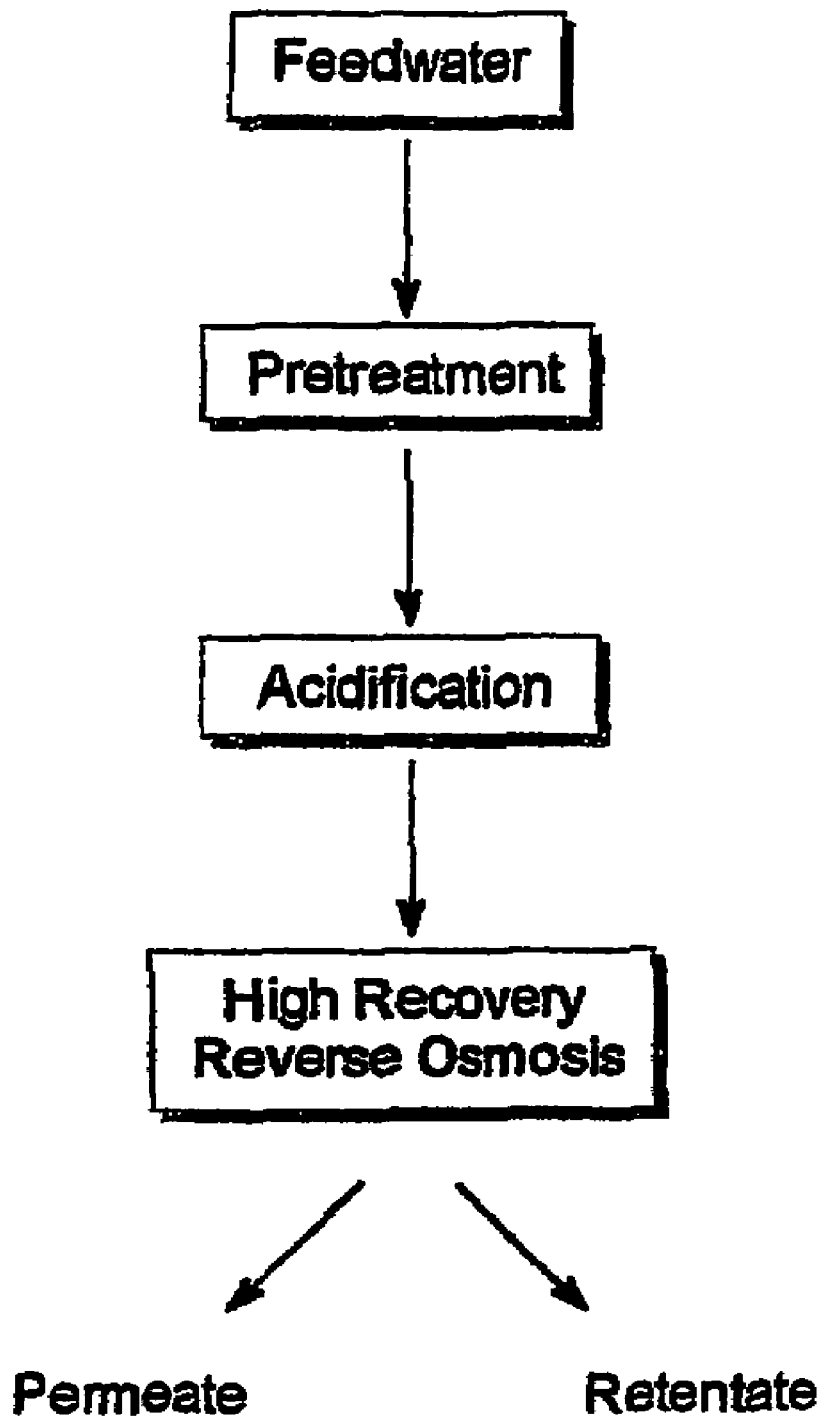
FIG. 1 shows a schematic representation of a process according to this invention.

The present invention permits high recovery of purified water from feedwaters which contain significant concentrations of silica without deposition of silica-containing scale or formation of colloidal silica by first adjusting the pH of such feedwater into the acidic range, and then operating the RO process at acidic pH. The discovery of this invention is surprising in view of the prior art, particularly the publications of Iler which teach that colloidal silica is rapidly formed, and silica scale is rapidly deposited, from silicate solutions when the pH is lowered (reference may be made to R. K. Iler, "The Chemistry of Silica . . . ", John Wiley & Sons, 1979, pp 83 ff). Without being limited by theory, we have found, contrary to what one would be led to believe by prior art teachings, that under acidic conditions (within an approximate pH range of 1-6), rates of polymerization and/or precipitation of silica from supersaturated solutions of silica (which are produced during RO as the result of concentration of acidic feedwaters which are not initially saturated in silica) are sufficiently slow so that operation of an RO process at high recovery is practical and economical. Former methods for achieving high recovery of silica-containing feedwaters as purified product water without silica deposition utilized equilibrium constraints imposed on polymerization and precipitation of silica at alkaline pH. Again, without being limited by theory, we believe that the present invention instead utilizes kinetic constraints imposed on polymerization and precipitation of silica by operation of an RO process at acidic pH. We therefore believe that the present invention is fundamentally distinct from and operates on different chemical principles than former methods based on comparison of their respective modes of operation.

The present invention does not consume relatively large quantities of base which are necessary to adjust and maintain feedwater at a strongly alkaline pH in former methods. Moreover, since the present invention operates under acidic conditions, extensive pretreatment of feedwater to remove hardness, carbon dioxide, and alkalinity to very low levels is also unnecessary. Growth and viability of many microorganisms present in natural waters is inhibited under acidic conditions, and biofouling concerns are thereby reduced. In an embodiment of this invention, the high recovery reverse osmosis process may be operated successfully on feedwaters which have received relatively minimal pretreatment(s) as compared with conventional methods. This provides economic advantages in terms of both lower equipment costs and lower operating costs.

The present invention is applicable to efficient purification of feedwaters which contain significant levels of natural silica, such as by way of example, groundwaters found in volcanic deposits. This invention is also applicable to treatment of partially-purified waters which still contain significant levels of silica, such as by way of example, from water softening, nanofiltration, electrodialysis and other operations well known in the art. This invention is also applicable to treatment of wastewaters which contain significant levels of silica, such as by way of example, retentates (brines) from conventional RO and nanofiltration operations.

FIG. 1 is a block diagram representing one embodiment of a process according to the present invention. In its simplest embodiment, the present invention may be utilized to process a feedwater directly. In this instance it would include the following sequence of unit operations:

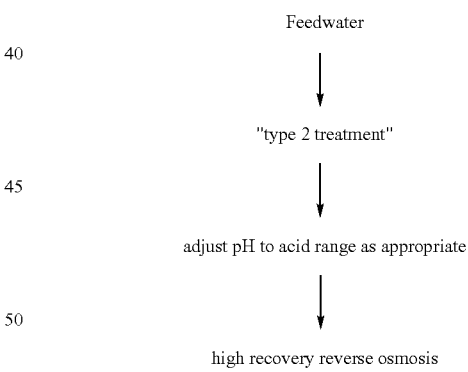

In the foregoing sequence, the term "type 1 treatment" is understood to encompass those standard RO pretreatments prior to conventional RO which would be deemed appropriate and necessary for the particular feedwater at hand by one skilled in the art. Such standard RO pretreatments are those that are ordinary, and appropriate for feedwaters for conventional RO processing. Such standard "type 1" pretreatments might include, for example, simple media filtration, multimedia filtration, microfiltration, ultrafiltration, dechlorination, irradiation, and the like. The latter techniques are primarily physical in nature, and typically do not substantially alter the soluble chemical composition of the feedwater. The nature and amount of acid to be added to the feedwater to adjust the pH into a desirable acidic pH range (acidification) will be determined by the composition of each particular feedwater. In general the present invention operates successfully when feedwater pH is in the range of from about 1 to about 6, and more preferably in the range from about 2 to about 5. The present invention has been operated successfully using both mineral acids (e.g., hydrochloric acid; sulfuric acid), and organic acids (e.g., gallic acid; ascorbic acid) to establish the desired pH.

Figure 2:
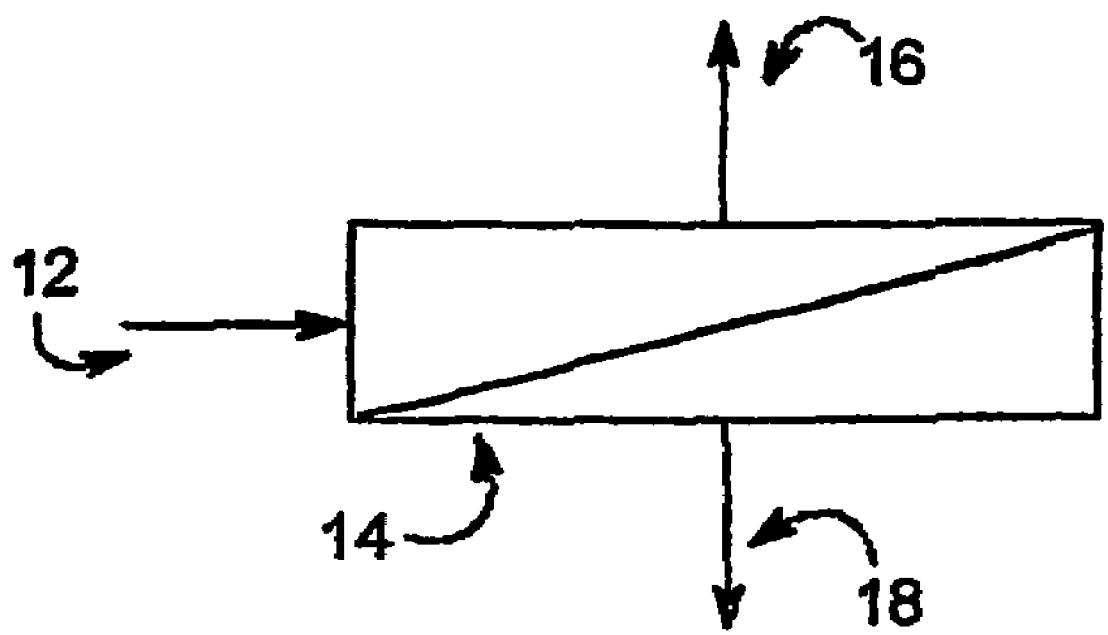
FIG. 2 schematically illustrates a simplified reverse osmosis apparatus for use in connection with this invention.

The reverse osmosis portion of the apparatus used in connection with the present invention is schematically illustrated in FIG. 2. As seen in FIG. 2, in its simplest form, the reverse osmosis portion of the high recovery reverse osmosis system comprises a reverse osmosis entrance conduit 12, a reverse osmosis system 14 comprising reverse osmosis elements, a reverse osmosis retentate exit conduit 16, and a reverse osmosis permeate exit conduit 18. By selection of appropriate size and/or number of stages for the reverse osmosis system relative to the volume of acidic pH-adjusted feedwater being processed, one of ordinary skill in this art would understand how to control the concentration of the retentate thereby to adjust the content and recovery of retentate and permeate from the reverse osmosis system as desired.

In another embodiment, the present invention may be utilized to process feedwater which has been previously treated by methods which alter the chemical composition of feedwater, but which do not substantially reduce the amount of silica. In this embodiment, the present invention includes the following sequence of unit operations:

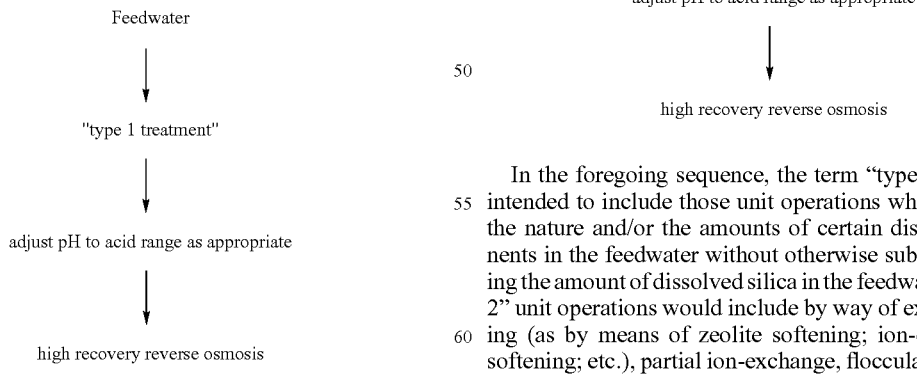

In the foregoing sequence, the term "type 2 treatment" is intended to include those unit operations which would alter the nature and/or the amounts of certain dissolved components in the feedwater without otherwise substantially altering the amount of dissolved silica in the feedwater. Such "type 2" unit operations would include by way of example, softening (as by means of zeolite softening; ion-exchange resin softening; etc.), partial ion-exchange, flocculation, precipitation, absorption, nanofiltration, electrodialysis, electrodialysis reversal, and the like. Additional unit operations which similarly process and affect the feedwater will be apparent to one skilled in the art. It will be apparent, for example, that a combination of a type 1 and a type 2 treatment could be used to pretreat a feedwater.

With certain feedwaters, pretreatment may be desirable to adjust concentrations of certain components of the feedwater which could otherwise adversely affect performance of the high recovery reverse osmosis process of this invention. Such components could be, by way of example, salts which would themselves precipitate and scale the system when concentrated above a certain limit, such as calcium sulfate; components that can promote or catalyze the precipitation of silica, such as magnesium, calcium, aluminum, iron, zinc, fluoride, phosphate ions, boric acid, and the like; and components that can promote precipitation of polymeric silica such as particulates, certain surfactants, polymers, and the like.

In yet a further embodiment, the present invention may be utilized to process a silica-containing wastewater. Such a wastewater may be processed directly, or may optionally be first subjected to a "pretreatment" as described above. In this embodiment the present invention would include the following sequence of unit operations:

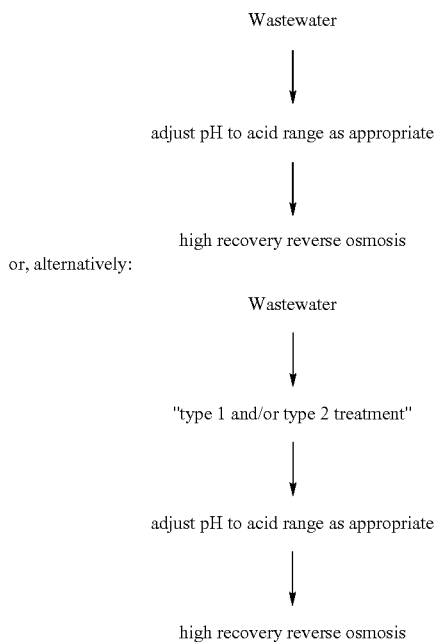

(where in FIG. 1, "Feedwater" is wastewater.)

One example of this embodiment is use of the high recovery reverse osmosis process to concentrate retentate from a nanofiltration operation. A second example is processing of retentate from a conventional RO operation by first treating such retentate by means of electrodialysis reversal (EDR) to provide a concentrated waste stream and a product stream which is substantially depleted of electrolytes. This EDR product stream, which may contain silica in approximately the same concentration as the original RO retentate, can be subsequently processed by high recovery reverse osmosis according to the present invention to provide a high recovery of water without deposition of silica in the system. Further examples include use of high recovery reverse osmosis to recover chemical and mechanical planarization (CMP) wastewater in semiconductor manufacturing operations, cooling tower wastewater (blowdown), and wastewaters to be further processed to comply with zero liquid discharge requirements. Additional examples of this embodiment will be apparent to those skilled in the art.

Again, without being limited by theory, we believe that the present invention utilizes kinetic constraints imposed on polymerization and precipitation of silica at acidic pH to facilitate efficient and stable operation of the high recovery reverse osmosis process while continuously maintaining a retentate stream that is supersaturated with respect to silica. Additional high recovery reverse osmosis process efficiencies, and increased stability of overall high recovery reverse osmosis operation, may be realized if the high recovery reverse osmosis process is periodically interrupted, and the high recovery reverse osmosis system is purged and cleaned in place (CIP) to remove potential silica nucleation sites which may be present. Such potential nucleation sites may be, by way of example, micro-colloidal silica particles, and other silica-containing particulates and deposits. A particularly effective CIP procedure for the high recovery reverse osmosis process includes the following sequence of operations: (1) switch the feed to the high recovery reverse osmosis process from the original feedwater to a cleansing water which is substantially depleted of silica and electrolytes (such as an accumulated portion of the high recovery reverse osmosis product water), and operate with this "clean" feedwater for a sufficient time to reduce the concentrations of silica and electrolytes in the retentate to be approximately the same as those in the "clean" feedwater; (2) add a sufficient amount of a base (such as sodium hydroxide, potassium hydroxide, ethanolamine, and the like) to the "clean" feedwater to raise the pH to 9-11, and soak, circulate, or recirculate this basic-adjusted cleansing water through the high recovery reverse osmosis system for a sufficient time to achieve equilibrium dissolution of any insoluble silica; (3) flush the system with the same basic-adjusted cleansing water used in step 2 above to reduce the concentration of silica in the retentate below its saturation limit at the operational, acidic pH; (4) add a sufficient amount of acid to the "clean" feedwater to reduce the pH back into the desired acidic pH-operating range for the high recovery reverse osmosis process; and, (5) resume high recovery reverse osmosis operation with the original silica-containing feedwater.

During recirculation of the basic CIP solution in step (2) above, silica concentration in the retentate stream may beneficially be monitored. If silica concentration in this recirculation stream exceeds the relevant silica solubility limit in "natural waters"—typically about 125 ppm at ambient conditions—then a portion of this retentate stream should be diverted, and this diverted volume replaced with "clean" feedwater. In this manner, silica concentration in the recirculating stream may be kept below the relevant natural solubility limit, and inadvertent precipitation of silica within the high recovery reverse osmosis system will be prevented when the pH of the recirculating solution is lowered as in step (4) above.

EXAMPLES

Example 1

In a laboratory batch RO experiment using a feedwater which approximates the composition of feedwater at an RO facility in Cape May, N.J. (approx. 60-70 ppm silica; Table 1 below), we performed a 7-fold concentration (85% recovery) of feed after adjusting the pH with 4300 ppm gallic acid, and obtained a clear permeate and a clear, stable retentate supersaturated with silica. The pH of both permeate and retentate was 3.9. The retentate contained 445 ppm silica as determined by the phosphomolybdate method (Hach Series 5000 Silica Analyzer). This silica concentration remained unchanged after 18 hours, thereby demonstrating the surprising stability of this supersaturated solution. After 186 hours under ambient laboratory conditions, the silica concentration in the retentate was still as high as 420 ppm, and the retentate remained clear.

TABLE 1

Composition of a well water (Cape May, NJ)

| Ions | mg/L |
|---|---|
| Sodium: | 387 |
| Calcium: | 18.9 |
| Magnesium: | 6.17 |
| Potassium: | 13.6 |
| Chloride: | 438 |
| Bicarbonate: | 286 |
| Sulfate: | 80 |
| Silica: | 67.4 |
| pH: | 7.1 |
| Conductivity (uS/cm) | 2048 |

Example 2

(a) The same simulated "Cape May, N.J." feedwater used in Example 1 above was first treated with a weak acid cation exchange resin, and then sparged with nitrogen to displace carbon dioxide. This treated water, with a pH of 2.7, was then concentrated 15-fold (94% recovery) by RO. The permeate had a pH of 2.6 and a silica concentration of 1.2 ppm. The clear retentate had a pH of 3.4 and a silica concentration of 1084 ppm.

(b-e) The procedure of Example 2a was repeated, except that the silica concentration of the feed, the % recovery, and the pH of the treated feedwater immediately prior to concentration by RO were varied. Results for Examples 2a-2e are reported in Table 2 below.

TABLE 2

| Ex. | Feed [SiO$_2$] (ppm) | approx. recovery (%) | retentate pH | retentate [SiO$_2$] (ppm) | permeate [SiO$_2$] (ppm) |
|---|---|---|---|---|---|
| 2a | 69.0 | 94 | 3.4 | 1084 | 1.2 |
| 2b | 75.2 | 94 | 3.3 | 1122 | 2.2 |
| 2c | 71.3 | 92 | 5.0 | 845 | 1.7 |
| 2d* | 71.3 | 92 | 7.7 | 278** | 2.4 |
| 2e* | 75.2 | 92 | 10.8 | 960 | 1.1 |

*Examples 2d and 2e are considered outside the scope of the present invention based on pH and are presented here for comparative purposes only.
**Example 2d retentate contained visible silica precipitate.

Example 3

Retentate from a conventional RO unit was demineralized by means of electrodialysis reversal (EDR) to give a brine waste and a product stream with the composition indicated in Table 3 below. The pH of this product stream was adjusted to 3.4 with HCl, and it was concentrated to approx. 95% recovery by high recovery reverse osmosis. Retentate from the high recovery reverse osmosis was clear and stable, had a pH of 4.5, and contained 786 ppm silica. The permeate was clear and contained 1.3 ppm silica (pH 3.3).

TABLE 3

Composition of an RO retentate after treatment by EDR

| Ions | mg/L |
|---|---|
| Calcium | 25.2 |
| Magnesium | 14.3 |
| Sodium | 83.2 |
| Potassium | 6.9 |
| Bicarbonate | 84.7 |
| Sulfate | 61.0 |
| Chloride | 124.0 |
| Fluoride | 0.4 |
| Nitrate | 3.5 |
| Silica | 41.6 |
| TDS (mg/l) | 444.8 |
| Conductivity (uS/cm) | 683.8 |
| pH | 5.6 |

The present invention may be embodied in other specific forms without departing from the spirit or essential characteristics thereof. The present embodiments are therefore to be considered illustrative and not restrictive, the scope of the invention being described by the appended claims rather than by the foregoing description, and all changes which come within the meaning and range of equivalency of the claims are therefore intended to be embraced therein.

The invention claimed is:

1. A process for treating a high silica feedwater having a silica concentration at or above 60 ppm silica, prior to being mixed with any recycled retentate produced by the process, using a reverse osmosis treatment apparatus comprising at least a reverse osmosis feed entrance conduit, a reverse osmosis retentate exit conduit, and a reverse osmosis permeate exit conduit, said process operating at high recovery of low-silica liquid while substantially avoiding formation of alkali-soluble silica-containing scale in the treatment apparatus by controlling the pH of a concentrating stream coming from the treatment apparatus, said process comprising at least the following steps:

(i) adjusting the pH of a feedwater having a silica concentration at or above 60 ppm silica prior to being mixed with any recycled retentate produced by the process to an acidic pH range to form an acidic pH-adjusted feedwater of sufficient acidity below a pH of 3.9 to produce in step (iii) a reverse osmosis retentate having a pH at or below 3.9 at the reverse osmosis retentate exit of the treatment apparatus;

(ii) passing said acidic pH-adjusted feedwater having a pH below 3.9 and a silica concentration at or above 60 ppm silica into the reverse osmosis feed entrance conduit, and operating the treatment apparatus substantially free of potential silica nucleation sites by maintaining the pH of the concentrating stream at or below 3.9;

(iii) treating said acidic pH-adjusted feedwater in said reverse osmosis treatment apparatus to produce: (a) a reverse osmosis permeate from the reverse osmosis permeate exit conduit representing about an 85% or greater recovery of liquid having a silica concentration of less than about 2.4 ppm of silica; and (b) a reverse osmosis retentate from the reverse osmosis retentate exit conduit, said reverse osmosis retentate having a pH at or below 3.9 and being stable with a supersaturated silica concentration at or above 386 ppm silica and further being clear and substantially free of precipitating silica; and, (iv) recovering reverse osmosis permeate from the reverse osmosis permeate exit conduit and reverse osmosis retentate from the reverse osmosis retentate exit conduit.

2. A process according to claim 1 wherein the reverse osmosis step is operated such that said reverse osmosis permeate is produced having a silica concentration not greater than about 1 to 2 milligrams per liter.

3. A process according to claim 2 wherein the reverse osmosis step is operated such that said permeate recovered from such permeate exit conduit represents about a 90% or greater recovery of liquid.

4. A process according to claim 1 further comprising the step of recycling at least a portion of the retentate recovered from a retentate exit conduit to said feed entrance conduit.

5. A process according to claim 1 further comprising the step of periodically performing a reverse osmosis apparatus cleansing treatment on said treatment apparatus, said cleansing treatment comprising seriatim the steps of:
(a) stopping the steps of passing of at least a portion of said acidic pH-adjusted feedwater into the feed entrance conduit of the treatment apparatus and of recovering permeate from a permeate exit conduit;
(b) passing first cleansing water substantially free of silica into said feed entrance conduit and through the interior of the treatment apparatus to produce a first cleansing period retentate from the retentate exit conduit of the treatment apparatus for a period until the silica concentration in said first cleansing period retentate is substantially equal to the silica concentration in said first cleansing water and thereafter stopping this step;
(c) passing basic pH-adjusted cleansing water having a pH in the range of from about 9 to about 11 into said feed entrance conduit and through the interior of the treatment apparatus at a temperature and for a period of time sufficient to effect substantial removal of alkali-soluble scale having a substantial silica content from internal portions of said apparatus;
(d) thereafter passing second cleansing water substantially free of silica into said feed entrance conduit and through the interior of the treatment apparatus to produce a second cleansing period retentate from the retentate exit conduit of the treatment apparatus for a period of time until the silica concentration in said second cleansing period retentate is substantially equal to the silica concentration in said second cleansing water and thereafter stopping this step;
(e) resuming the step of passing at least a portion of said acidic pH-adjusted feedwater into said feed entrance conduit to produce: (i) a reverse osmosis permeate from a permeate exit conduit of said apparatus, and (ii) a clear reverse osmosis retentate from a retentate exit conduit, and,
(f) resuming the step of recovering permeate from a permeate exit conduit and retentate from a retentate exit conduit, whereby said periodic apparatus cleansing treatment removes scale nucleation sites from the interior portions of the treatment apparatus without ever flowing silica-bearing water at an intermediate pH through said apparatus thereby avoiding silica precipitation conditions while the apparatus is undergoing a changing pH environment.

6. A process for treating high silica feedwater having a silica concentration of about 60-70 ppm silica, prior to being mixed with any recycled retentate produced by the process, using a reverse osmosis treatment apparatus comprising at least a reverse osmosis feed entrance conduit, a reverse osmosis retentate exit conduit, and a reverse osmosis permeate exit conduit, said process operating at high recovery of low-silica liquid while substantially avoiding formation of alkali-soluble silica-containing scale in the treatment apparatus by controlling the pH of a concentrating stream coming from the treatment apparatus, said process comprising at least the following steps:
(i) adjusting the pH of a feedwater having a silica concentration of about 60-70 ppm silica prior to being mixed with any recycled retentate produced by the process to an acidic pH range to form an acidic pH-adjusted feedwater of sufficient acidity below a pH of 3.9 to produce in step (iii) a reverse osmosis retentate having a pH at or below 3.9 at the reverse osmosis retentate exit of the treatment apparatus and also treating the high silica feedwater with a weak acid cation exchange resin and then sparging with nitrogen to displace carbon dioxide to obtain pH-adjusted feedwater having a pH of 2.7;
(ii) passing said acidic pH-adjusted feedwater having a pH of 2.7 and a silica concentration of about 60-70 ppm silica into the reverse osmosis feed entrance conduit, and operating the treatment apparatus substantially free of potential silica nucleation sites by maintaining the pH of the concentrating stream at or below 3.9;
(iii) treating said acidic pH-adjusted feedwater in said reverse osmosis treatment apparatus to concentrate the pH-adjusted feedwater 15-fold by RO to produce: (a) a 94% permeate recovery, said permeate having a pH of 2.6 and a silica concentration of 1.2 ppm; and (b) a clear retentate, said retentate having a pH of 3.4 and a silica concentration of 1084 ppm; and,
(iv) recovering reverse osmosis permeate from the reverse osmosis permeate exit conduit and reverse osmosis retentate from the reverse osmosis retentate exit conduit.

7. A process for treating a high silica feedwater having a silica concentration of approximately 60-70 ppm silica, prior to being mixed with any recycled retentate produced by the process, using a reverse osmosis treatment apparatus comprising at least a reverse osmosis feed entrance conduit, a reverse osmosis retentate exit conduit, and a reverse osmosis permeate exit conduit, said process operating at high recovery of low-silica liquid while substantially avoiding formation of alkali-soluble silica-containing scale in the treatment apparatus by controlling the pH of a concentrating stream coming from the treatment apparatus, said process comprising at least the following steps:
(i) adjusting the pH of a feedwater having a silica concentration of approximately 60-70 ppm silica prior to being mixed with any recycled retentate produced by the process to an acidic pH range to form an acidic pH-adjusted feedwater of sufficient acidity below a pH of 3.9 to produce in step (iii) a reverse osmosis retentate having a pH at or below 3.9 at the reverse osmosis retentate exit of the treatment apparatus;
(ii) passing said acidic pH-adjusted feedwater having a pH below 3.9 and a silica concentration of approximately 60-70 ppm silica into the reverse osmosis feed entrance conduit, and operating the treatment apparatus substantially free of potential silica nucleation sites by maintaining the pH of the concentrating stream at or below 3.9;
(iii) treating said acidic pH-adjusted feedwater in said reverse osmosis treatment apparatus to produce: (a) a reverse osmosis permeate from the reverse osmosis permeate exit conduit representing about an 85% recovery of liquid having a silica concentration of less than about 2.4 ppm of silica; and (b) a reverse osmosis retentate from the reverse osmosis retentate exit conduit, said reverse osmosis retentate having a pH at or below 3.9 and being stable with a supersaturated silica concentration of about 445 ppm silica and further being clear and substantially free of precipitating silica; and, (iv) recovering reverse osmosis permeate from the reverse osmosis permeate exit conduit and reverse osmosis retentate from the reverse osmosis retentate exit conduit.

8. A process for treating a high silica feedwater having a silica concentration of approximately 60-70 ppm silica, prior to being mixed with any recycled retentate produced by the process, using a reverse osmosis treatment apparatus comprising at least a reverse osmosis feed entrance conduit, a reverse osmosis retentate exit conduit, and a reverse osmosis permeate exit conduit, said process operating at high recovery of low-silica liquid while substantially avoiding formation of alkali-soluble silica-containing scale in the treatment apparatus by controlling the pH of a concentrating stream coming from the treatment apparatus, said process comprising at least the following steps:

(i) adjusting the pH of a feedwater having a silica concentration of approximately 60-70 ppm silica prior to being mixed with any recycled retentate produced by the process to an acidic pH range to form an acidic pH-adjusted feedwater having a pH of about 2.7 to produce in step (iii) a reverse osmosis retentate having a pH of about 3.4 at the reverse osmosis retentate exit of the treatment apparatus;

(ii) passing said acidic pH-adjusted feedwater having a pH of about 2.7 and a silica concentration of approximately 60-70 ppm silica into the reverse osmosis feed entrance conduit, and operating the treatment apparatus substantially free of potential silica nucleation sites by maintaining the pH of the concentrating stream at or below 3.9;

(iii) treating said acidic pH-adjusted feedwater in said reverse osmosis treatment apparatus to produce: (a) a reverse osmosis permeate from the reverse osmosis permeate exit conduit having a pH of about 2.6 and representing approximately a 94% recovery of liquid having a silica concentration of about 1.2 ppm of silica; and (b) a reverse osmosis retentate from the reverse osmosis retentate exit conduit, said reverse osmosis retentate having a pH of about 3.4 and being stable with a supersaturated silica concentration of about 1084 ppm silica and further being clear and substantially free of precipitating silica; and, (iv) recovering reverse osmosis permeate from the reverse osmosis permeate exit conduit and reverse osmosis retentate from the reverse osmosis retentate exit conduit.

9. A process for treating a high silica feedwater having a silica concentration of approximately 60-70 ppm silica, prior to being mixed with any recycled retentate produced by the process, using a reverse osmosis treatment apparatus comprising at least a reverse osmosis feed entrance conduit, a reverse osmosis retentate exit conduit, and a reverse osmosis permeate exit conduit, said process operating at high recovery of low-silica liquid while substantially avoiding formation of alkali-soluble silica-containing scale in the treatment apparatus by controlling the pH of a concentrating stream coming from the treatment apparatus, said process comprising at least the following steps:

(i) adjusting the pH of a feedwater having a silica concentration of approximately 60-70 ppm silica prior to being mixed with any recycled retentate produced by the process to an acidic pH range to form an acidic pH-adjusted feedwater having a pH of about 2.7 to produce in step (iii) a reverse osmosis retentate having a pH of about 3.3 at the reverse osmosis retentate exit of the treatment apparatus;

(ii) passing said acidic pH-adjusted feedwater having a pH of about 2.7 and a silica concentration of approximately 60-70 ppm silica into the reverse osmosis feed entrance conduit, and operating the treatment apparatus substantially free of potential silica nucleation sites by maintaining the pH of the concentrating stream at or below 3.9;

(iii) treating said acidic pH-adjusted feedwater in said reverse osmosis treatment apparatus to produce: (a) a reverse osmosis permeate from the reverse osmosis permeate exit conduit having a pH of about 2.6 and representing approximately a 94% recovery of liquid having a silica concentration of about 2.2 ppm of silica; and (b) a reverse osmosis retentate from the reverse osmosis retentate exit conduit, said reverse osmosis retentate having a pH of about 3.3 and being stable with a supersaturated silica concentration of about 1122 ppm silica and further being clear and substantially free of precipitating silica; and, (iv) recovering reverse osmosis permeate from the reverse osmosis permeate exit conduit and reverse osmosis retentate from the reverse osmosis retentate exit conduit.

10. A process for treating a high silica feedwater having a silica concentration at or above 60 ppm silica prior to being mixed with any recycled retentate produced by the process, using a reverse osmosis treatment apparatus comprising at least a reverse osmosis feed entrance conduit, a reverse osmosis retentate exit conduit, and a reverse osmosis permeate exit conduit, said process operating at high recovery of low-silica liquid while substantially avoiding formation of alkali-soluble silica-containing scale in the treatment apparatus by controlling the pH of a concentrating stream coming from the treatment apparatus, said process comprising at least the following steps:

(i) adjusting the pH of a feedwater having a silica concentration at or above 60 ppm silica prior to being mixed with any recycled retentate produced by the process to an acidic pH range to form an acidic pH-adjusted feedwater of sufficient acidity below a pH of 3.9 to produce in step (iii) a reverse osmosis retentate having a pH at or below 3.9 at the reverse osmosis retentate exit of the treatment apparatus;

(ii) passing said acidic pH-adjusted feedwater having a pH below 3.9 and a silica concentration at or above 60 ppm silica into the reverse osmosis feed entrance conduit, and operating the treatment apparatus substantially free of potential silica nucleation sites by maintaining the pH of the concentrating stream at or below 3.9;

(iii) treating said acidic pH-adjusted feedwater in said reverse osmosis treatment apparatus to produce: (a) a reverse osmosis permeate from the reverse osmosis permeate exit conduit representing about an 90% or greater recovery of liquid having a silica concentration of less than about 2.4 ppm of silica; and (b) a reverse osmosis retentate from the reverse osmosis retentate exit conduit, said reverse osmosis retentate having a pH at or below 3.9 and being stable with a supersaturated silica concentration at or above 578 ppm silica and further being clear and substantially free of precipitating silica; and, (iv) recovering reverse osmosis permeate from the reverse osmosis permeate exit conduit and reverse osmosis retentate from the reverse osmosis retentate exit conduit.

11. A process according to claim 10 wherein the reverse osmosis step is operated such that said reverse osmosis permeate is produced having a silica concentration not greater than about 1 to 2 milligrams per liter.

12. A process for treating a high silica feedwater having a silica concentration at or above 60 ppm silica prior to being mixed with any recycled retentate produced by the process, using a reverse osmosis treatment apparatus comprising at least a reverse osmosis feed entrance conduit, a reverse osmosis retentate exit conduit, and a reverse osmosis permeate exit conduit, said process operating at high recovery of low-silica liquid while substantially avoiding formation of alkali-soluble silica-containing scale in the treatment apparatus by controlling the pH of a concentrating stream coming from the treatment apparatus, said process comprising at least the following steps:

(i) adjusting the pH of a feedwater having a silica concentration at or above 60 ppm silica prior to being mixed with any recycled retentate produced by the process to an acidic pH range to form an acidic pH-adjusted feedwater of sufficient acidity below a pH of 3.9 to produce in step (iii) a reverse osmosis retentate having a pH at or below 3.9 at the reverse osmosis retentate exit of the treatment apparatus;

(ii) passing said acidic pH-adjusted feedwater having a pH below 3.9 and a silica concentration at or above 60 ppm silica into the reverse osmosis feed entrance conduit, and operating the treatment apparatus substantially free of potential silica nucleation sites by maintaining the pH of the concentrating stream at or below 3.9;

(iii) treating said acidic pH-adjusted feedwater in said reverse osmosis treatment apparatus to produce: (a) a reverse osmosis permeate from the reverse osmosis permeate exit conduit representing about a 94% recovery of liquid having a silica concentration of less than about 2.4 ppm of silica; and (b) a reverse osmosis retentate from the reverse osmosis retentate exit conduit, said reverse osmosis retentate having a pH at or below 3.4 and being stable with a supersaturated silica concentration above about 1000 ppm silica and further being clear and substantially free of precipitating silica; and, (iv) recovering reverse osmosis permeate from the reverse osmosis permeate exit conduit and reverse osmosis retentate from the reverse osmosis retentate exit conduit.

* * * * *